3,374,227
SULFONAMIDES
Paul Schmidt, Therwil, Ernst Schweizer and Kurt Eichenberger, Basel, and Max Wilhelm, Allschwil, Switzerland, assignors to Ciba Corporation, New York, N.Y., a corporation of Delaware
No Drawing. Filed Dec. 26, 1963, Ser. No. 333,675
Claims priority, application Switzerland, Jan. 10, 1963, 342/63; Nov. 5, 1963, 13,597/63
19 Claims. (Cl. 260—239.9)

The present invention relates to new sulfonamides. More especially it concerns 5-(para-aminobenzenesulfonamido) - 3 - (lower-alkoxy-lower alkyl)-pyrazoles that contain, in 1-position, a hydrocarbon radical that may also be substituted, the $N_4$-formaldehyde condensation products thereof and the $N_1$-acyl derivatives and the salts of the said compounds.

The new compounds may also contain substituents in 4-position, especially alkyl radicals such as lower alkyl radicals or alkoxy groups, such as lower alkoxy groups.

The hydrocarbon radical in 1-position that may be substituted is, for example, a phenyl or lower alkyl radical that may be substituted, or a cycloalkyl radical, for example a lower cycloalkyl radical, such as a cyclopentyl or cyclohexyl radical. As substituents for the phenyl radical there may be mentioned more especially lower alkyl radicals, lower alkoxy groups, halogen atoms such as fluorine, chlorine or bromine atoms and the pseudohalogen trifluoromethyl. Substituents of cycloalkyl radicals are especially lower alkyl groups. As substituents in the lower alkyl radical there may be mentioned, for example, lower alkoxy groups or halogen atoms.

Lower alkyl radicals are especially those that contain 1 to 5 carbon atoms such as methyl, ethyl, n-propyl or iso-propyl radicals or straight or branched butyl or pentyl radicals bound in any position. Lower alkoxy radicals are, for example, those that contain the aforesaid alkyl radicals, especially methoxy, ethoxy or propoxy radicals.

The lower alkoxy radicals contained in the lower alkoxy-lower alkyl radicals are, for example, those mentioned above. The alkylene radicals that join the oxygen atom to the pyrazole nucleus are advantageously alkylene radicals containing 1 to 5 but more especially 1 to 3 carbon atoms such as the methylene radical, or ethylene, propylene, butylene or pentylene radicals that may be bound in any position. Lower alkoxy-lower alkyl radicals are especially radicals of the formula $RO—(CH_2)_n—$, in which R represents an alkyl radical containing 1 to 3 carbon atoms and $n$ represents an integer of 1 to 3.

As $N_1$-acyl derivatives there may be mentioned more especially those in which the acyl radical is a lower aliphatic, or an aromatic or araliphatic carboxylic acid radical, for example a carbalkoxy radical, such as the carbethoxy radical, or preferably the radical of a fatty acid, for example, of a lower alkanoic acid, for example the propionyl radical, butyryl radical, valeryl radical or caproyl radical, or the radical of a high fatty acid, for example, the lauroyl, palmityl or oleyl radical, or the radical of a phenyl fatty acid such as phenyl acetic acid or of a benzoic acid such as benzoic acid. Primarily, however, the acyl radical is the acetyl radical.

By $N_4$-formaldehyde condensation products is to be understood more especially those products that are obtained, for example, by reacting one mol of formaldehyde with approximately 1 or 2 mols of a para-aminobenzenesulfonamide.

The new compounds possess good anti-bacterial properties. For example, they exhibit a very good healing action in the case of animals infected experimentally, for example, in the case of mice infected with streptococci. They have advantages over comparable known compounds. They can therefore be used as chemotherapeutic agents, for example, in the case of bacterial infections. They are also suitable for use as additives in animal feeds and can be used as intermediate products in the manufacture of other valuable chemotherapeutic agents.

In addition, the new compounds in admixture with hypoglycemic benzenesulfonyl ureas, particularly tolbutamide, bring about an increase in the concentration of the benzenesulfonyl ureas in the blood and delay a decrease in this concentration. They thus potentiate and prolong the effect of the benzenesulfonyl ureas.

Compounds that deserve special mention are those of the formula

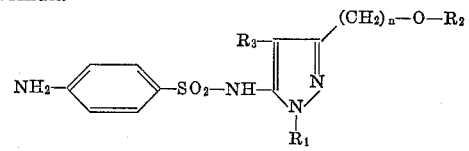

in which $R_1$ represents a phenyl radical, for example, a phenyl- or para-chlorophenyl radical or a lower alkyl radical such as methyl, iso-propyl, secondary butyl or 2-methyl-butyl-4, $R_2$ represents a lower alkyl radical, for example, methyl, ethyl or propyl, $R_3$ represents hydrogen or methyl, and $n$ represents 2 or more especially 1 and especially 5-(para - aminobenzenesulfonamido)-1-phenyl-3-(methoxymethyl)-pyrazole, the $N_4$-formaldehyde condensation products thereof, and also the $N_1$-acyl derivatives of the said compounds.

The new compounds can be prepared by methods in themselves known. More especially, the procedure is to react a 3-(lower alkoxy-lower alkyl)-5-amino-pyrazole that contains, in 1-position, a hydrocarbon radical that may be substituted, with a compound of the formula

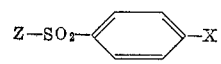

in which Z represents a halogen atom, especially chlorine, and X represents the amino group or a nitro, azo or acylamino group, and, in the compounds so obtained, that contain a nitro, azo or acylamino group, this group is converted into the amino group by reduction or hydrolysis and/or any bis - para - X - benzenesulfonyl compounds so obtained are split to form the mono-para-X-benzenesulfonyl compounds and/or, if desired, the compounds so obtained are $N_1$-acylated and/or the compounds so obtained that contain the free amino groups are reacted with formaldehyde to form the formaldehyde condensation compounds, the said operations being carried out in any desired sequence.

The condensation of the 3-(lower alkoxy-lower alkyl)-5-aminopyrazole with the para-X-benzenesulfonyl-halide can be carried out with the use of the usual condensing agents, for example, alkali metal carbonates, but more especially tertiary organic bases such as the aminopyrazole itself or pyridine, picoline, lutidine, collidine, lower trialkylamines such as trimethyl or triethylamine or N:N'-tetraalkyldi-aminoalkanes, for example, N:N'-tetramethyl-ω:ω'-di-aminohexane and, if desired, the usual diluents such as benzene, toluene, methylene chloride, chloroform, methylethyl ketone, acetone, dioxane, nitrobenzene, and the like. Depending on the reaction conditions, such as condensing agents, reaction temperature, diluents or use of an excess of sulfonic acid halide, there are obtained, either as by-products or main products, bis-para-X-benzene sulfonyl compounds that can be converted in known manner, if desired, with the simultaneous conversion of X into the amino group, into the mono-para-X-benzene sulfonyl compounds. For example, the bis-compounds can be converted into the mono-compounds by hydrolysis or aminolysis, if desired, with simultaneous hydrolysis of the radical X.

The possible conversion of the radical X into the amino group, that has already been mentioned, is carried out in known manner by reduction or hydrolysis.

Acylamino groups are, for example, aliphatic acylamino groups such as carbalkoxy amino groups, for example, the carbethoxyamino group, alkanoylamino groups such as the propionyl-, butyryl- or caproylamino group, but more especially the acetylamino group, dihalogenphosphorylamino groups, for example, the dichlorophosphorylamino group. The acyl radicals in the acylamino groups may also be acyl radicals of dibasic acids. For example, there can be used as starting materials compounds of the formula

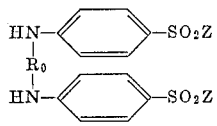

in which $R_0$ represents the acyl radical of a dibasic acid, especially carbonic acid, or, for example, an alkane-dicarboxylic acid, and Z has the meaning given above and represents more especially a halogen.

An acylamino group that can be split by hydrogenolysis is the carbobenzoxy amino group. An azo group is, for example, an aryl- or more especially a phenyl-azo group, in the last-mentioned case there being advantageously used a compound of the formula

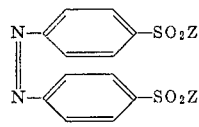

as starting material in which formula Z has the meaning given and represents more especially a halogen atom.

The hydrolysis, aminolysis or reduction of the said groups are carried out in known manner.

A specially advantageous process consists in reacting para-acetylaminobenzene sulfochloride with a 3-(lower alkoxy-lower alkyl)-5-aminopyrazole that contains, in 1-position, a hydrocarbon radical that may be substituted, and then hydrolysing the condensation product.

The $N_1$-acylation is carried out in the usual manner with the use of $N_1$-acylating agents. Such agents are mainly acid anhydrides or acid halides, such as acid chlorides. The reaction is advantageously carried out in the presence of basic agents such as inorganic or organic bases, for example, alkali metal carbonates or tertiary amines such as pyridine, picoline, lutidine, collidine, trimethylamine, triethylamine, tributylamine or 1:6-bis-dimethylamino-hexane, and in the presence of inert diluents, especially organic solvents such as dioxane, benzene, toluene, halogenated hydrocarbons, for example, methylene chloride or chloroform, dimethylformamide, lower aliphatic ketones such as acetone or methylethyl ketone or, if desired, the basic agent itself, for example, pyridine or mixture containing pyridine, especially pyridine and acetone. Advantageously, the operation is carried out in a medium that is as free from water as possible. If an acid halide is used, there can also be used a metal salt of the sulfonamide, for example an alkali metal salt or advantageously the silver salt, in which case the addition of basic agents recommended above is superfluous. However, there is nothing to prevent them from being used as well, for example, as diluents.

In the $N_1$-acylation of compounds in which X represents the amino group, care should be taken to ensure that the reaction is carried out under mild conditions and with the use of approximately equimolecular amounts of the reactants in order to prevent the formation of $N_1$:$N_4$-bis-acyl compounds or the formation of $N_4$-acyl compounds caused by acyl migration. It is therefore advantageous to work at a lower temperature, for example, at a temperature below 40° C., for example, between 10 and 30° C. and in an anhydrous medium. When using acid halides, it is generally of advantage to use the metal salts of the sulfonamide, for example, the silver salt, as starting material.

When the acyl radical is introduced into the $N_1$-nitrogen atom of a compound in which the symbol X does not represent an amino group, there is advantageously used a compound in which X represents a group that can be converted into an amino group by reduction. The said group is then reduced in known manner, advantageously under conditions that do not bring about hydrolysis and not at a raised temperature in order to prevent elimination or transfer of the $N_1$-acyl radical to the $N_4$-nitrogen atom. Specially suitable is reduction with hydrogen in the presence of catalysts, for example, noble metal catalysts such as palladium on charcoal.

The formaldehyde condensation products are obtained when a compound in which X represents the amino group, for example, 5-(para-aminobenzene sulfonamido)-1-phenyl-3-(methoxymethyl)-pyrazole or an acyl derivative thereof, is reacted with formaldehyde in the presence of dilute acids. Instead of formaldehyde itself there can also be used agents that yield formaldehyde such as paraformaldehyde or hexamethylenetetramine. The reaction is advantageously carried out in the presence of water and at room temperature or at a slightly raised temperature. As acids there are primarily used strongly inorganic acids such as hydrohalic acids, sulfuric acid, perchloric acid, or phosphoric acid.

Depending on the reaction conditions and the starting materials selected, the end products are obtained in the free form or in the form of their salts which are also included in the scope of the invention. As salts there may be mentioned especially metal salts, particularly those with alkali, alkaline earth metals, such as sodium, potassium, calcium, magnesium or aluminum. The salts of the new compounds may be converted by a method known per se into the free compounds, for example by reaction with an acidic agent, such as an acid. On the other hand, a resulting free compound containing a hydrogen atom at the $N_1$-nitrogen atom may be converted into a salt by reaction with a base, for example a hydroxide of an alkali, alkaline earth metal, for example sodium potassium or calcium hydroxide.

The above or other salts of the new compounds may be used for purifying the sulfonamide compounds obtained by converting the free compounds into the salts, separating the latter and liberating the free compounds again from the salts. Owing to the close relationship between the new compounds in the free form and in the form of a salt thereof, whenever a free base is referred to in this context, a corresponding salt is also intended, provided such is possible or appropriate under the circumstances.

The invention further includes any variant of the present process in which an intermediate obtainable at any stage of the process is used as starting material and any remaining steps are carried out, or the process is discontinued at any stage thereof, or in which a starting material is formed under the reaction conditions or is used as a salt.

For example, a 3-(lower alkoxy-lower alkyl)-5-aminopyrazole that contains in 1-position a hydrocarbon radical that may be substituted, may also be prepared in known manner and, without being isolated, may be reacted with a para-X-benzene sulfonic acid halide.

For the reactions of the invention such starting materials are primarily used as yield the above-mentioned preferred compounds.

Some of the starting materials are known or, if they are new, may be obtained by a method known per se.

The present invention also provides new starting materials and intermediate products such as mono- and bis-para-X-benzene sulfonyl-5-amino-3-(lower alkoxy-lower alkyl)-pyrazoles that contain in 1-position a hydrocarbon radical that may be substituted.

The new compounds can be used for example, in the form of pharmaceutical preparations that contain the active material in admixture or conjunction with an organic or inorganic, solid or liquid pharmaceutical excipient suitable for enteral, parenteral or local administration. Suitable excipients are substances that do not react with the new compounds such as water, gelatine, lactose, starch, colloidal silicic acid, magnesium stearate, talc vegetable oils, benzyl alcohols, gums, polyalkylene glycols, white petroleum jelly, cholesterol or other known medicinal excipients. The pharmaceutical preparations may be, for example, tablets, dragees, ointments or creams, or in liquid form as solutions, suspensions or emulsions. They may be sterilized and/or contain assistants such as preserving, stabilizing, wetting or emulsifying agents, salts for regulating the osmotic pressure of buffers. They may further contain other therapeutically valuable substances. The preparations are formulated by conventional methods.

The new and effective compounds can also be used as additives for animal feeds. Thus, the invention also includes such animal feeds or additives for animal feeds that contain the new sulfonamides of the kind defined in admixture with the conventional excipients.

The following examples illustrate the invention.

EXAMPLE 1

6.5 grams of para-acetylaminobenzene sulfonyl chloride are added to a solution of 5 grams of 1-phenyl-3-(methoxymethyl)-5-aminopyrazole in 50 cc. of pyridine, while stirring. When the reaction has subsided, the mixture is heated for 1 hour at 90° C. The pyridine is then distilled off in vacuo and the residue is dissolved by digestion with a sodium bicarbonate solution of 10% strength. After treatment with active carbon and filtration, the filtrate is adjusted to pH 2 by the addition of concentrated hydrochloric acid while cooling with ice. The precipitate is boiled for 2 hours with 100 cc. of 2 N sodium hydroxide, the filtered solution is adjusted to pH 5.5 to 6 at 60° C. with acetic acid, in which process the 5 - (para - amino - benzene sulfonamido) - 1 - phenyl - 3 - (methoxymethyl)-pyrazole that is formed and that corresponds to the formula

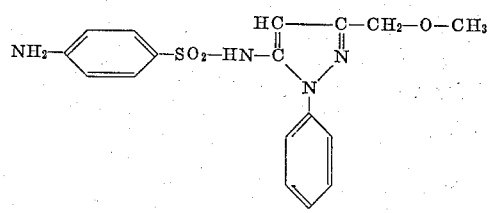

precipitates in the form of crystals. After several recrystallizations from a mixture of alcohol and water its melting point rises first to 153° C. and then to 164–165° C.

The 1 - phenyl-3-(methoxymethyl) - 5-aminopyrazole used as starting material can be prepared as follows:

29.5 grams of methoxy acetic acid ethyl ester and 20.5 grams of acetonitrile are condensed in liquid ammonia with 11.5 grams of sodium to form β-keto-γ-methoxy-butyronitrile. This compound is taken up in benzene and reacted with 43 grams of phenylhydrazine while being boiled for 4 hours. The reaction mixture is then concentrated in vacuo, the oily residue is taken up in ether, washed with a sodium bicarbonate solution, dried over sodium sulfate, and the solvent is distilled off. Distillation of the oil that remains yields 1-phenyl-3-(methoxymethyl)-5-aminopyrazole of the formula

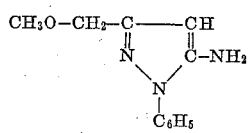

boiling point: 155° C. at 0.15 mm. Hg.

EXAMPLE 2

17 grams of 1-phenyl-3-(methoxymethyl)-4-methyl-5-aminopyrazole are dissolved in 150 cc. of absolute pyridine and treated with 20 grams of para-acetylaminobenzenesulfonyl chloride for 20 minutes with stirring; stirring is continued for 24 hours at room temperature. The solution is then poured onto a mixture of hydrochloric acid and ice in such a way that the temperature does not rise above 5° C. and the pH value always remains at 1–2. The air-dried precipitate is hydrolysed with 300 cc. of 2 N-sodium hydroxide solution for 2 hours, boiled for a short time with active carbon and filtered. The pH value of the filtrate is adjusted to 5.5 to 6 with acetic acid while cooling with ice, 5-(para-aminobenzene-sulfonamido)-1-phenyl - 3 - (methoxymethyl)-4-methyl-pyrazole of the formula

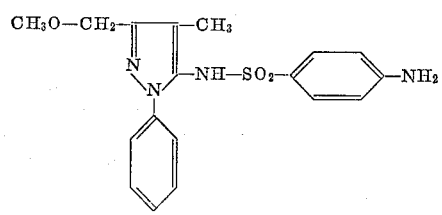

precipitating in the form of crystals. After recrystallization from a mixture of alcohol and water the compound melts at 163–164° C.

The 1-phenyl-3-(methoxymethyl)-4 - methyl-5-amino-pyrazole used as starting material may be prepared as follows:

32 grams of methoxyacetic acid ethyl ester and 27.5 grams of propionitrile are condensed in liquid ammonia with 11.5 grams of sodium to form α-methyl-β-keto-γ-methoxy-butyronitrile. A methylene chloride solution containing 25.4 grams of the above compound is evaporated in vacuo; 300 cc. of absolute ethanol are then added rapidly and the reaction mixture treated with 23.8 grams of phenyl hydrazine with stirring. The reaction solution is stirred for 8 hours under reflux and then fractionated to yield 1-phenyl-3-(methoxymethyl)-4-methyl-5-amino-pyrazole boiling at 150° C. under 0.4 mm. of pressure.

EXAMPLE 3

15.6 grams of para-acetylaminobenzene-sulfonyl chloride are added in portions to a solution of 14.2 grams of 1-phenyl-3-(methoxymethyl) - 4-methoxy-5-aminopyrazole in 150 cc. of absolute pyridine and the whole stirred for 24 hours at room temperature. The solution is then poured onto a mixture of hydrochloric acid and ice in such a way that the temperature does not rise above 5° C. and the pH value always remains at 1–2. The air-dried precipitate is hydrolysed for 2 hours with 300 cc. of 2 N-sodium hydroxide solution, then boiled for a short time with active carbon and filtered. The pH value of the filtrate is adjusted to 5.5–6 with acetic acid while cooling with ice, 5-(para-aminobenzene-sulfonamido)-1-phenyl-3-(methoxymethyl)-4-methoxypyrazole of the formula

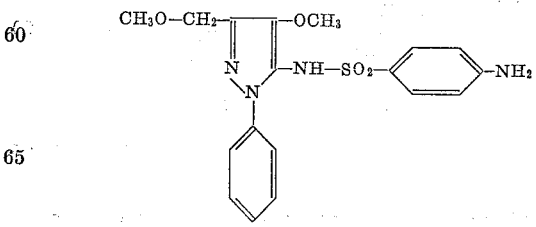

precipitating. The product melts at 155–156° C. after recrystallization from a mixture of ethanol and water.

The 1-phenyl-3-(methoxymethyl)-4-methoxy-5-amino-pyrazole used as starting material may be prepared as follows:

35.5 grams of methoxyacetonitrile in the form of the sodium salt are condensed in liquid ammonia with 17.5 grams of methoxyacetonitrile to form α-methoxy-β-imino-γ-methoxy-butyronitrile. A methylene chloride solution containing 28.4 grams of the above compound is evaporated in vacuo, the residue taken up with 250 cc. of absolute ethanol and heated at the boil for 8 hours with 23.8 grams of phenyl hydrazine. After evaporation of the solvent, the residue is distilled to yield 1-phenyl-3-(methoxymethyl)-4-methoxy-5-aminopyrazole boiling at 153–155° C. under 0.02 mm. of pressure.

EXAMPLE 4

16 grams of para-acetylaminobenzenesulfonyl chloride are added in portions and with stirring to 10 grams of 1-isopropyl-3-(methoxymethyl)-5-aminopyrazole dissolved in 100 cc. of absolute pyridine, and stirring is continued for 24 hours at room temperature. The solution is then poured onto a mixture of hydrochloric acid and ice in such a way that the temperature does not rise above 5° C. and the pH value always remains at 1–2. The air-dried precipitate is hydrolysed with 400 cc. of 2 N-sodium hydroxide solution for 2 hours, boiled for a short time with active carbon and filtered. The pH value of the filtrate is adjusted to 5.5–6 with acetic acid while cooling with ice, 5-(para-aminobenzenesulfonamido) - 1-isopropyl-3-methoxymethyl)-pyrazole of the formula

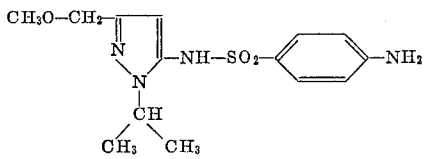

precipitating. After recrystallization from a mixture of ethanol and water the product melts at 170° C.

The 1-isopropyl-3-(methoxymethyl)-5-amino-pyrazole used as starting material may be obtained by reacting 22.6 grams of the β-keto-γ-methoxybutyronitrile described in Example 1 with 29.6 grams of isopropyl hydrazine in 250 cc. of absolute ethanol by boiling for 12 hours and then fractionating the solution. The 1-isopropyl-3-(methoxymethyl)-5-aminopyrazole boils at 103° C. under 0.07 mm. of pressure and melts at 49–50° C.

EXAMPLE 5

58 grams of para-acetylaminobenzenesulfonyl chloride are added in portions to a solution of 46 grams of 1-phenyl-3-(ethoxymethyl)-5-amino-pyrazole in 200 cc. of absolute pyridine with stirring, and stirring is continued for 12 hours at room temperature. The solution is then poured onto a mixture of hydrochloric acid and ice in such a way that the temperature does not rise above 5° C. and the pH value always remains at 1–2. The air-dried precipitate is hydrolyzed with 1 litre of 2.5 N-sodium hydroxide solution for 2 hours, boiled with active carbon for a short time and filtered. The pH value of the filtrate is adjusted to 5.5–6 with acetic acid while cooling with ice, 5 - (para - aminobenzenesulfonamido) - 1 - phenyl - 3 - (ethoxymethyl)-pyrazole of the formula

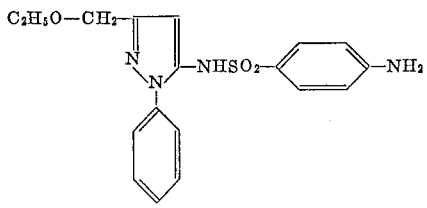

precipitating. After recrystallization from a mixture of ethanol and water the product melts at 155° C.

The 1-phenyl-3-(ethoxymethyl)-5-aminopyrazole used as starting material may be prepared as follows:

66 grams of ethoxyacetic acid ethyl ester and 41 grams of acetonitrile are condensed in liquid ammonia with 23 grams of sodium to form β-keto-γ-ethoxybutyronitrile. 50 grams of an ethanolic solution of the above compound are reacted with 43 grams of phenyl hydrazine to form 1 - phenyl-3-(ethoxymethyl)-5-aminopyrazole boiling at 146° C. under 0.005 mm.

EXAMPLE 6

70 grams of para-acetylaminobenzenesulfonyl chloride are added in portions and with stirring to a solution of 65 grams of 1-phenyl-3-(methoxyethyl)-5-aminopyrazole in 250 cc. of absolute pyridine, and stirring is continued for 48 hours at room temperature. The solution is then poured onto a mixture of hydrochloric acid and ice in such a way that the temperature does not rise above 5° C. and the pH value always remains at 1–2. The air-dried precipitate is hydrolysed for 2 hours with 1.25 litres of 2.5 N-sodium hydroxide solution, boiled for a short time with active carbon and filtered. The pH value of the filtrate is adjusted to 5.5–6 with acetic acid while cooling with ice, 5-(para-aminobenzenesulfonamido)-1-phenyl-3-(methoxyethyl)-pyrazole of the formula

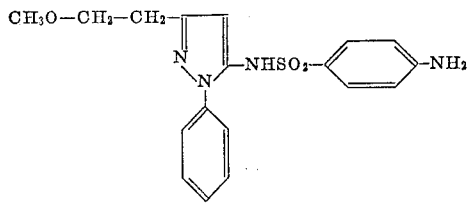

precipitating. After recrystallization from a mixture of ethanol and water, the product melts at 174–176° C.

The 1-phenyl-3-(methoxyethyl)-5-aminopyrazole used as starting material is obtained by reacting 83 grams of methoxypropionic acid methyl ester and 58 grams of acetonitrile with 32.5 grams of sodium in liquid ammonia to form β-keto-δ-methoxy-valeric acid nitrile and reacting 63.5 grams of the resulting compound in 500 cc. of absolute ethanol with 54 grams of phenyl hydrazine in the conventional manner; B.P. 152–153° C. under 0.005 mm. of pressure.

EXAMPLE 7

7.2 grams of 5 - (para-aminobenzenesulfonamido)-1-phenyl-3-(methoxymethyl)-pyrazole are suspended in a mixture of 12 cc. of acetone and 1.56 grams of pyridine. 2.64 grams of acetic anhydride are added dropwise to the suspension in the course of 10 minutes, and after about 1 hour dissolution is complete. The reaction solution is stirred for a few hours and then allowed to stand in a refrigerator until crystallization sets in. A white product precipitates, to which are added 20 cc. of ammonia solution of 2–3% strength while cooling with ice, and which is rapidly filtered with suction and washed with a little ethanol. $N_1$-acetyl-5-(para-aminobenzenesulfonamido)-1-phenyl-3-(methoxymethyl)-pyrazole of the formula

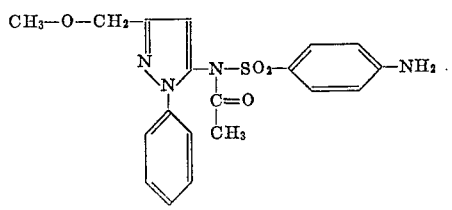

melts at 155–157° C.

EXAMPLE 8

14.3 grams of 5-(para-aminobenzenesulfonamido)-1-phenyl-3-(methoxymethyl)-pyrazole are dissolved in as little 2 N-hydrochloric acid as possible and then treated with 9 cc. of formaldehyde solution of 40% strength while being vigorously stirred. After being stirred for 1 hour, the reaction solution is neutralized with concentrated sodium hydroxide solution, the precipitate is suction-filtered and the filtrate thoroughly washed with water. N:N' - methylene-bis-[5-(para-amino-benzenesulfonamido)-1-phenyl-3-(methoxymethyl)-pyrazole] melts in the form of the hydrate at 203–205° C. with decomposition.

EXAMPLE 9

12 grams of para-acetylaminobenzenesulfonyl chloride are added in portions and with stirring to a solution of 11 grams of 1-(para-chlorophenyl)-3-(methoxymethyl)-5-aminopyrazole in 75 cc. of absolute pyridine, and stirring is continued for 12 hours at room temperature. The solution is then poured onto a mixture of hydrochloric acid and ice in such a way that the temperature does not rise above 5° C. and the pH value always remains at 1–2. The air-dried precipitate is hydrolysed for 2 hours with 275 cc. of 2.5 N-sodium hydroxide solution, boiled for a short time with active carbon and filtered. The pH value of the filtrate is adjusted to 5.5–6 with acetic acid while cooling with ice, 5-(para-aminobenzenesulfonamido)-1-(parachlorophenyl)-3-(methoxymethyl)-pyrazole of the formula

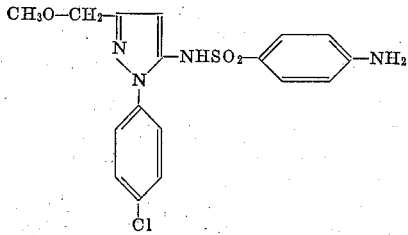

precipitating. After recrystallization from a mixture of ethanol and water the product melts at 173–175° C.

The 1-(para-chlorophenyl)-3-(methoxymethyl)-5-aminopyrazole used as starting material is obtained by heating 34 grams of the β-keto-γ-methoxy-butyronitrile described in Example 1 in 500 cc. of absolute ethanol with 37.5 grams of para-chlorophenyl hydrazine for 8 hours under reflux and working up in the conventional manner; B.P. 215–218° C. under 0.3 mm. of pressure.

EXAMPLE 10

12 grams of para-acetylaminobenzenesulfonyl chloride are added in portions and with stirring to a solution of 9.7 grams of 1-cyclohexyl-3-(methoxymethyl)-5-aminopyrazole in 75 cc. of absolute pyridine, and stirring is continued for 12 hours at room temperature. The solution is then poured onto a mixture of hydrochloric acid and ice in such a way that the temperature does not rise above 5° C. and the pH value always remains at 1–2. The air-dried precipitate is hydrolysed for 2 hours with 275 cc. of 2.5 N-sodium hydroxide solution, boiled for a short time with active carbon and filtered. The pH value of the filtrate is adjusted to 5.5–6 with acetic acid while cooling with ice, 5-(para-aminobenzenesulfonamido)-1-cyclohexyl-3-(methoxymethyl)-pyrazole of the formula

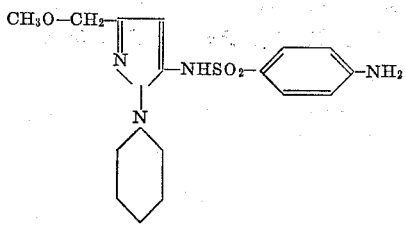

precipitating. After recrystallization from a mixture of ethanol and water the product melts at 154–155° C.

The 1-cyclohexyl-3-(methoxymethyl)-5-aminopyrazole used as starting material is obtained by reacting 11.3 grams of the β-keto-γ-methoxybutyronitrile described in Example 1 in 250 cc. of absolute ethanol with 11.4 grams of cyclohexyl hydrazine; B.P. 156–159° C. under 0.02 mm. of pressure.

EXAMPLE 11

23.9 grams of para-nitrobenzenesulfonyl chloride are added in portions to a solution of 20.3 grams of 1-phenyl-3-(methoxymethyl)-5-aminopyrazole in 100 cc. of absolute pyridine. After being stirred for 12 hours at room temperature the reaction mixture is poured onto a mixture of ice and hydrochloric acid in such a way that the pH value always remains between 1 and 2 and the temperature does not rise above 5° C. The precipitating 5-(para-nitrobenzenesulfonamido)-1-phenyl-3-(methoxymethyl)-pyrazole is dissolved in a mixture of alcohol and water with the addition of sodium hydroxide solution and hydrogenated with 3 grams of Raney nickel. The alcohol is then distilled off in vacuo and the solution acidified with acetic acid. 5-(para-aminobenzenesulfonamido)-1-phenyl-3-(methoxymethyl)-pyrazole precipitates which, after being recrystallized several times from a mixture of ethanol and water, melts at 164–165° C. and is identical with the product obtained according to Example 1.

EXAMPLE 12

29 grams of para-carbethoxyaminobenzenesulfonyl chloride are added with stirring to a solution of 20.3 grams of 1-phenyl-3-(methoxymethyl)-5-aminopyrazole in 100 cc. of absolute pyridine, and stirring is continued for 12 hours at room temperature. The solution is then poured onto a mixture of hydrochloric acid and ice in such a way that the temperature does not rise above 5° C. and the pH value always remains at 1–2. The air-dried precipitate is hydrolysed with 200 cc. of 2 N-sodium hydroxide solution for 1 hour, boiled a short time with active carbon and filtered. The pH value of the filtrate is adjusted to 5.5–6 with acetic acid while cooling with ice, 5-(para-aminobenzenesulfonamido)-1-phenyl-3-(methoxymethyl)-pyrazole precipitating. After several recrystallizations from a mixture of alcohol and water the product melts at 164–165° C. and is identical with the products obtained according to Examples 1 and 11.

In an analogous manner as described in the foregoing examples there may be prepared from para-acetylaminobenzenesulfonyl chloride and the corresponding 5-aminopyrazole:

5-(para-aminobenzenesulfonamido)-1-(β-butoxyethyl)-3-(γ-methoxypropyl)-4-ethyl-pyrazole,
5-(para-aminobenzenesulfonamido)-1-(γ-methoxypropyl)-3-(methoxymethyl)-pyrazole,
5-(para-aminobenzenesulfonamido)-1-(β-chloroethyl)-3-(γ-ethoxypropyl)-pyrazole,
5-(para-aminobenzenesulfonamido)-1-(3-butyl-cyclohexyl)-3-(ethoxymethyl)-4-(n-propyl)-pyrazole,
5-(para-aminobenzenesulfonamido)-1-(para-tolyl)-3-(α-methoxyethyl)-pyrazole,
5-(para-aminobenzenesulfonamido)-1-(para-ethoxyphenyl)-3-(β-methoxyethyl)-4-(n-butoxy)-pyrazole,
5-(para-aminobenzenesulfonamido)-1-(ortho-trifluoromethylphenyl)-3-(methoxymethyl)-pyrazole or
5-(para-aminobenzenesulfonamido)-1-(meta-bromophenyl)-3-(methoxymethyl)-pyrazole.

What is claimed is:
1. A member selected from the group consisting of compounds of the formula

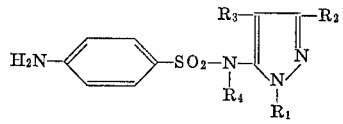

in which $R_1$ stands for a member selected from the group consisting of lower alkyl, lower alkoxy-lower alkyl, halogeno-lower alkyl, phenyl, lower alkyl-phenyl, lower alkoxy-phenyl, halogenophenyl, trifluoromethylphenyl, cyclo-lower alkyl and lower alkyl-cyclo-lower alkyl, $R_2$ for lower alkoxy-lower alkyl, $R_3$ for a member selected from the group consisting of hydrogen, lower alkyl and lower alkoxy and $R_4$ for a member selected from the group consisting of hydrogen, alkanoyl containing 1 to 16 carbon atoms, phenyl-lower alkanoyl, benzoyl, alkali metals, alkaline earth metals and earth metals and their formaldehyde condensation products obtained by reacting about 1 mol formaldehyde with about 1–2 mols sulfonamide.

2. A compound of the formula

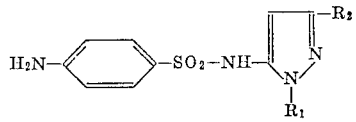

in which $R_1$ stands for phenyl and $R_2$ for lower alkoxy-lower alkyl in the free form.

3. A compound of the formula

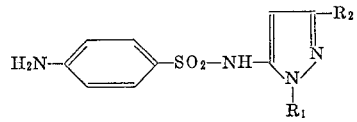

in which $R_1$ stands for phenyl and $R_2$ for lower alkoxy-lower alkyl in the form of a salt.

4. An $N_1$-lower alkanoyl derivative of a compound claimed in claim 2.

5. A compound of the formula

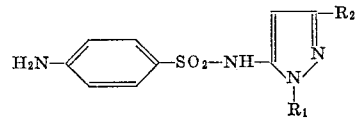

in which $R_1$ stands for lower alkyl and $R_2$ for lower alkoxy-lower alkyl in the free form.

6. A compound of the formula

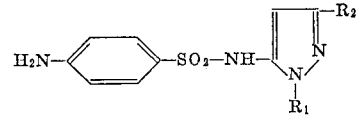

in which $R_1$ stands for lower alkyl and $R_2$ for lower alkoxy-lower alkyl in the form of a salt.

7. An $N_1$-lower alkanoyl derivative of a compound claimed in claim 5.

8. 5-(para-aminobenzenesulfonamido) - 1 - phenyl - 3-(methoxymethyl)-pyrazole.

9. N:N'-methylene - bis - [5 - (para-aminobenzenesulfonamide)-1-phenyl-3-(methoxymethyl)-pyrazole].

10. $N_1$-acetyl - 5 - (para-aminobenzenesulfonamido)-1-phenyl-3-(methoxymethyl)-pyrazole.

11. 5-(para-aminobenzenesulfonamido) - 1 - phenyl-3-(methoxymethyl)-4-methyl-pyrazole.

12. 5-(para-aminobenzenesulfonamido) - 1 - phenyl-3-(methoxymethyl)-4-methoxypyrazole.

13. 5-(para-aminobenzenesulfonamido) - 1 - isopropyl-3-(methoxymethyl)-pyrazole.

14. 5-(para-aminobenzenesulfonamido) - 1 - phenyl-3-(ethoxymethyl)-pyrazole.

15. 5-(para-aminobenzenesulfonamido) - 1 - phenyl-3-(β-methoxyethyl)-pyrazole.

16. 5 - (para - aminobenzenesulfonamido) - 1 - (para-chlorophenyl)-3-(methoxymethyl)-pyrazole.

17. 5 - (para - aminobenzenesulfonamido) - 1 - cyclohexyl-3-(methoxymethyl)-pyrazole.

18. A compound of the formula

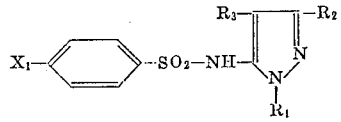

in which $R_1$ stands for a member selected from the group consisting of lower alkyl, lower alkoxy-lower alkyl, halogeno-lower alkyl, phenyl, lower alkyl-phenyl, lower alkoxy-phenyl, halogenophenyl, trifluoromethylphenyl, cyclo-lower alkyl and lower alkyl-cyclo-lower alkyl, $R_2$ for lower alkoxy-lower alkyl, $R_3$ for a member selected from the group consisting of hydrogen, lower alkyl and lower alkoxy and $X_1$ for a member selected from the group consisting of nitro, azo and carboxylic acid acylamino.

19. A bis-(para-X-benzenesulfonyl) - 5 - amino - 1-$R_1$-3-$R_2$-4-$R_3$-pyrimidine in which $R_1$ stands for a member selected from the group consisting of lower alkyl, lower alkoxy-lower alkyl, halogeno-lower alkyl, phenyl, lower alkyl-phenyl, lower alkoxy-phenyl, halogenophenyl, trifluoromethylphenyl, cyclo-lower alkyl and lower alkyl-cyclo-lower alkyl, $R_2$ for lower alkoxy-lower alkyl, $R_3$ for a member selected from the group consisting of hydrogen, lower alkyl and lower alkoxy and X for a member selected from the group consisting of amino, nitro, azo and carboxylic acid acylamino.

References Cited

UNITED STATES PATENTS

| | | | |
|---|---|---|---|
| 2,494,524 | 1/1950 | Sprague | 260—239.9 |
| 2,988,547 | 6/1961 | Achelis et al. | 260—239.9 |
| 3,028,382 | 4/1962 | Achelis et al. | 260—239.9 |
| 3,198,791 | 8/1965 | Weyer et al. | 260—239.9 |

OTHER REFERENCES 1,119,869, December 1961, Germany Auslegeschrift, 260–239.9.

1,140,940, December 1962, Germany Auslegeschrift, 260—239.9.

1,144,730, March 1963, Germany Auslegeschrift, 260—239.9.

Braker et al.: J. Am. Chem. Soc., vol. 69, pp. 3072 and 3076 (1947).

Van Dyke et al.: J. of Pharmacology, vol. 83, p. 207 (1947).

Horstmann et al.: Arnz. Forch., vol. 11, p. 682 (1961).

JOHN D. RANDOLPH, *Primary Examiner.*